(12) United States Patent
Neese

(10) Patent No.: US 11,019,924 B2
(45) Date of Patent: Jun. 1, 2021

(54) FISHING ROD STORAGE SYSTEM

(71) Applicant: Grady-White Boats, Inc., Greenville, NC (US)

(72) Inventor: David A Neese, Greenville, NC (US)

(73) Assignee: GRADY-WHITE BOATS, INC., Greenville, NC (US)

( * ) Notice: Subject to any disclaimer, the term of this patent is extended or adjusted under 35 U.S.C. 154(b) by 0 days.

(21) Appl. No.: 16/275,058

(22) Filed: Feb. 13, 2019

(65) Prior Publication Data

US 2020/0253377 A1    Aug. 13, 2020

(51) Int. Cl.
| A47B 81/00 | (2006.01) |
| B63B 17/00 | (2006.01) |
| A01K 97/10 | (2006.01) |
| A47B 43/00 | (2006.01) |
| A47F 7/00  | (2006.01) |

(52) U.S. Cl.
CPC ............ *A47B 81/005* (2013.01); *A01K 97/10* (2013.01); *A47B 43/00* (2013.01); *B63B 17/00* (2013.01); *A47F 7/0028* (2013.01)

(58) Field of Classification Search
CPC ......... B63B 35/14; B63B 35/05; B63B 29/04; B63B 29/06; B63B 17/00; B63B 34/15; B63B 2029/043; B63B 2029/046; A47B 81/005; A47B 43/00; A47F 7/0028; Y10S 224/922; A01K 97/08; A01K 97/10; B60R 7/08; B60R 9/08
USPC .................................................. 114/362–364
See application file for complete search history.

(56) References Cited

U.S. PATENT DOCUMENTS

| D158,473 | S | * | 5/1950 | Lahr | D6/337 |
| 2,792,053 | A | * | 5/1957 | Kursman | A47K 3/122 248/240.1 |
| 2,854,147 | A | * | 9/1958 | Derr | A01K 97/08 211/70.8 |
| 3,120,404 | A | * | 2/1964 | Bramming | A45C 9/00 297/118 |
| 3,421,632 | A | * | 1/1969 | Wood | A47B 81/005 211/70.8 |
| 3,635,433 | A | * | 1/1972 | Anderson | A01K 97/08 211/70.8 |
| D244,072 | S | * | 4/1977 | Schaecher | D6/555 |
| 4,068,601 | A | * | 1/1978 | Marsh | A47B 5/04 108/134 |
| D272,787 | S | * | 2/1984 | Rumbaugh | D6/552 |
| 4,632,457 | A | * | 12/1986 | Hofrichter | B60N 2/3047 108/134 |
| D296,393 | S | * | 6/1988 | Tuzi | D6/336 |
| 4,782,624 | A |   | 11/1988 | Head |  |
| 4,823,723 | A | * | 4/1989 | Brooks | A01K 97/10 114/343 |

(Continued)

*Primary Examiner* — Jonathan Liu
*Assistant Examiner* — Devin K Barnett
(74) *Attorney, Agent, or Firm* — Olive & Olive, P.A.

(57) ABSTRACT

A fishing rod storage system within a cabin of a boat includes plural holes in the floor of a cabin of a boat arranged to receive and support the handle of a fishing rod in each hole. A retractable shelf is mounted on a cabinet above and adjacent the plural holes. The shelf has cutout sections corresponding in number to the plurality of holes. The cutout sections are aligned respectively with the holes for receiving a section of a fishing rod therein. A securing line is used to retain the fishing rods in the cutout sections.

14 Claims, 6 Drawing Sheets

(56) References Cited

U.S. PATENT DOCUMENTS

| | | | | |
|---|---|---|---|---|
| 4,823,724 A * | 4/1989 | Lumpkin | B63B 59/02 | 114/219 |
| 4,836,127 A * | 6/1989 | Wille | A01K 97/10 | 114/343 |
| 4,856,452 A * | 8/1989 | Pingel | B63B 45/04 | 114/364 |
| D314,112 S * | 1/1991 | Dainty | | 5/947 |
| 4,986,427 A * | 1/1991 | Law | A47B 81/005 | 211/117 |
| 5,127,181 A * | 7/1992 | Teixeira | A01K 97/10 | 297/188.2 |
| 5,137,319 A | 8/1992 | Sauder | | |
| 5,152,494 A * | 10/1992 | Frunzar | A01K 97/08 | 248/513 |
| 5,415,472 A * | 5/1995 | Brise | A47B 45/00 | 211/153 |
| 5,487,475 A * | 1/1996 | Knee | A47B 81/005 | 211/70.8 |
| 5,588,542 A * | 12/1996 | Winkler, Jr. | A47B 81/005 | 211/70.8 |
| 5,657,883 A | 8/1997 | Badia | | |
| 5,716,113 A * | 2/1998 | Plourde | A47B 96/025 | 222/160 |
| 5,860,839 A * | 1/1999 | Hall | B63B 29/04 | 114/364 |
| 5,979,102 A * | 11/1999 | Sagryn | A01K 97/08 | 114/364 |
| 6,305,741 B1 * | 10/2001 | Fernandez | A47C 9/06 | 108/48 |
| 6,360,902 B1 * | 3/2002 | Searles | A01K 97/10 | 211/70.8 |
| 6,789,494 B2 * | 9/2004 | Neese | B63B 29/04 | 114/343 |
| 7,219,464 B1 | 5/2007 | Kujawa | | |
| 7,322,149 B1 * | 1/2008 | Quintero | A01K 97/08 | 206/315.11 |
| D597,776 S * | 8/2009 | Taggart | | D6/552 |
| 8,800,788 B1 * | 8/2014 | Guidry | B60R 7/08 | 211/70.8 |
| 2005/0052850 A1 * | 3/2005 | Dickey | G11B 33/02 | 361/724 |
| 2005/0204983 A1 * | 9/2005 | Dykes | B63B 25/002 | 114/78 |
| 2006/0000407 A1 * | 1/2006 | Henderson | B63B 29/04 | 114/364 |
| 2008/0115401 A1 * | 5/2008 | Roemer | A01K 97/08 | 43/21.2 |
| 2008/0263760 A1 * | 10/2008 | Meyers | A47K 3/122 | 4/578.1 |
| 2009/0188421 A1 * | 7/2009 | Devine | B63B 29/04 | 114/363 |
| 2011/0099883 A1 * | 5/2011 | Baltes | A01K 97/10 | 43/21.2 |
| 2014/0371642 A1 * | 12/2014 | Torregrosa Pascual | A47C 15/004 | 601/158 |
| 2015/0059637 A1 * | 3/2015 | Johns | B63B 34/20 | 114/363 |
| 2015/0223439 A1 * | 8/2015 | Caudle | A01K 97/08 | 43/21.2 |
| 2016/0031532 A1 * | 2/2016 | Bergmark | B60N 2/686 | 114/363 |
| 2016/0107544 A1 * | 4/2016 | Byun | B60N 2/1635 | 297/232 |
| 2017/0106949 A1 * | 4/2017 | Neese | B63B 29/04 | |
| 2017/0150836 A1 * | 6/2017 | Rivard | A47B 13/16 | |
| 2018/0064061 A1 * | 3/2018 | Koskey, Jr. | E06B 7/28 | |
| 2018/0185111 A1 * | 7/2018 | Shuart | A61B 50/20 | |
| 2019/0023357 A1 * | 1/2019 | Barwick | B63B 29/04 | |
| 2019/0223424 A1 * | 7/2019 | Moses | B63B 25/002 | |
| 2019/0246794 A1 * | 8/2019 | Neese | B63B 29/02 | |
| 2019/0343274 A1 * | 11/2019 | Cass | A47B 23/00 | |

\* cited by examiner

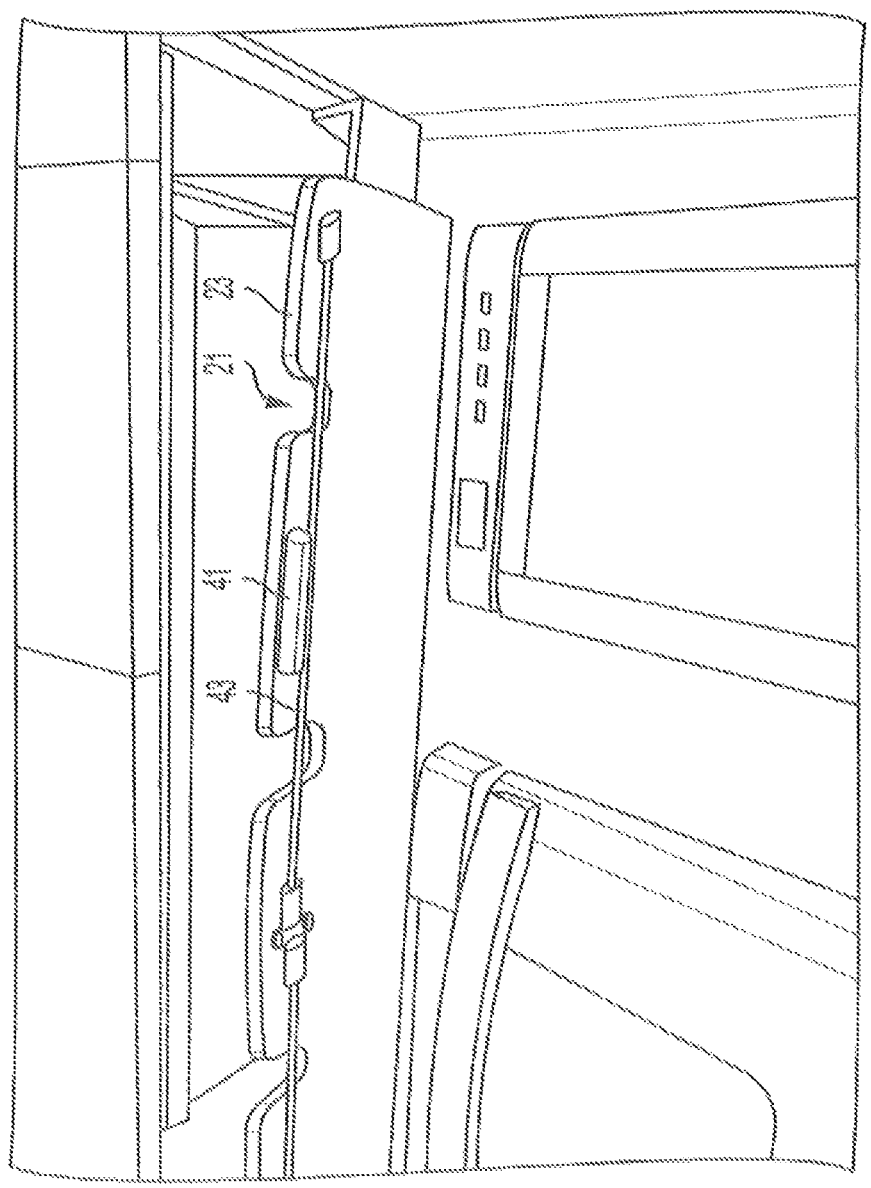

FISHING ROD STORAGE SYSTEM

FIELD OF THE INVENTION

This invention relates to fishing rod storage systems for securing fishing rods within cabins of boats. More specifically, the invention relates to a fishing rod storage system through which fishing rods can be easily secured within a boat cabin and held therein in a manner in which the fishing rods are held securely, but can be easily removed for use in fishing from a boat.

BACKGROUND

More affluent fishermen often own large, expensive boats with open cock-pits and a cabin. Such fishermen often purchase and use high-end, expensive fishing rods. Often such fishermen like to display these fishing rods in a cabin of a boat in a manner in which the rod is held and displayed within the cabin in a secure assembly.

The cabins on larger boats often have a galley consisting of a cabinet that houses a microwave oven, refrigerator and other like appliances. It is desirable to have a system for storing fishing rods in such cabins in a protected environment.

On such boats, there is no easy way of securing the fishing rods in a secure condition within the cabin without the rods being knocked around due to motion of the boat. Therefore, it is desirable to provide a storage system that secures fishing rods within the cabin of a boat without taking up much space within the cabin.

In accordance with the invention, the problems with storing fishing rods securely in a protected environment are avoided by providing a system for securing and displaying rods within a cabin of a boat.

SUMMARY

In accordance with the invention there is provided a fishing rod storage system typically arranged within the cabin of a boat. At least one hole and preferably a plurality of holes are provided in a floor of a cabin of a boat, each hole preferably having a bottom and sized to receive and support a handle of a fishing rod therein. A retractable shelf is mounted on a cabinet above and adjacent the plurality of holes. The shelf has cutout sections corresponding in number to the plurality of holes. The cutout sections are aligned respectively with the holes for receiving therein a fishing rod at a section located between the handle of a fishing rod and the tip thereof opposite the handle. A securing line is provided on the retractable shelf for engaging and retaining the fishing rods within the respective cutout sections through contact therewith. In place of a securing line such as a bungee cord, individual ties or clips can be arranged with each cutout section.

The system further comprises a movable cover for covering the plurality of holes when not being used for storing rods. The retractable shelf preferably has a handle positioned to allow the handle to be grasped and for pulling the shelf into a position where the cutout sections can receive the fishing rods. A countertop is preferably mounted on the counter in a manner raised from the top of the counter to provide a recess within which the retractable shelf is received and can be pulled to extend therefrom, and the countertop also provides a working surface above the retractable shelf.

BRIEF DESCRIPTION OF THE DRAWINGS

Having thus briefly described the invention, the same will become better understood from the following detailed discussion made with reference to the appended drawings wherein:

FIG. 6 is a perspective view looking upward showing the retractable shelf and cutout sections, with the retractable shelf in extended position.

DETAILED DESCRIPTION OF AN EXEMPLARY EMBODIMENT

Having generally described the invention, the same will become better understood from the following detailed description of an exemplary embodiment thereof made with reference to the appended drawings.

Figure 1:
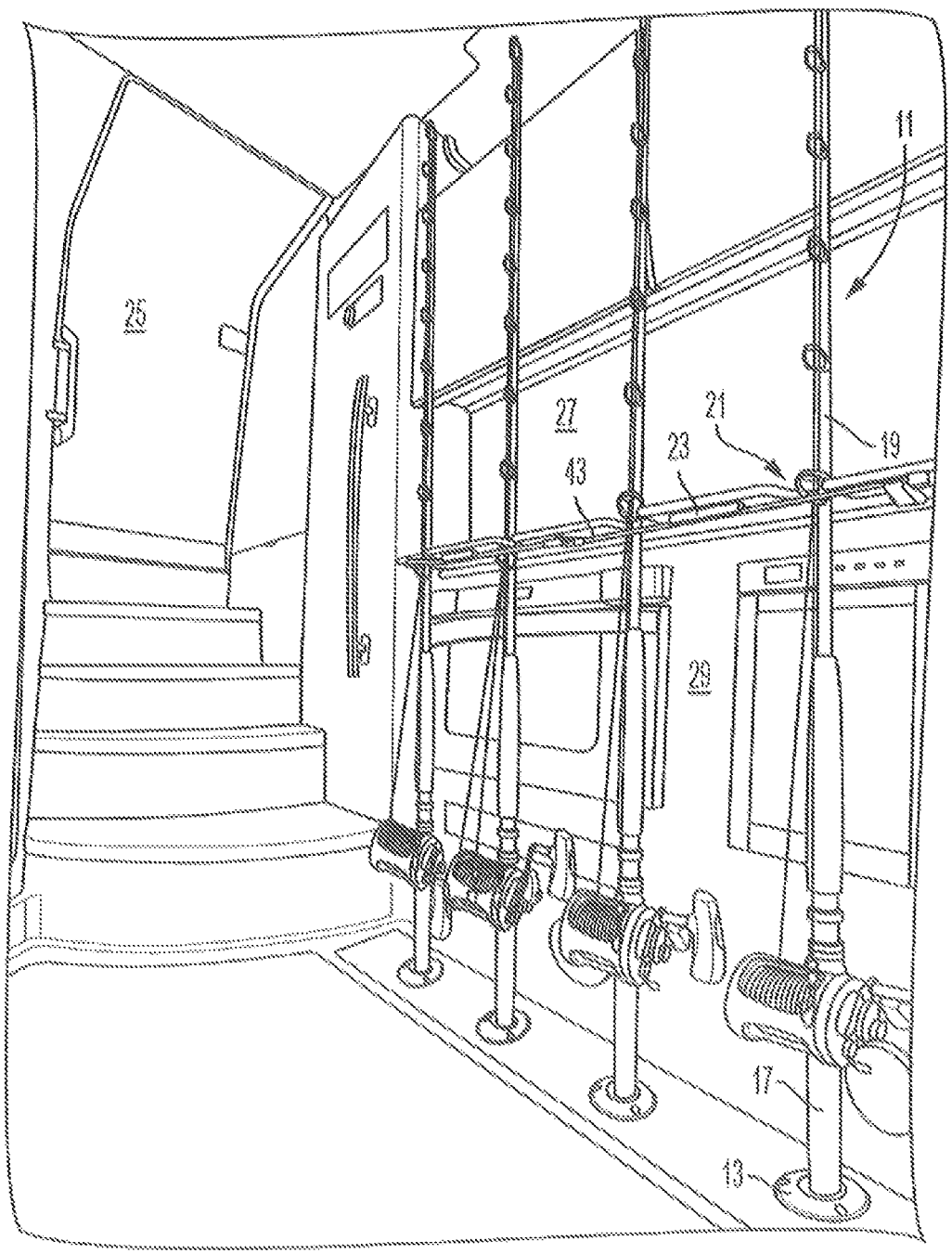
FIG. 1 is a perspective view of a rod storage system of the invention shown with fishing rods, i.e., four (4) fishing rods, held securely thereby.

FIG. 1 illustrates the rod storage system 11 of the invention. Typically, the system 11 is found within a cabin 25 of high-end fishing boats. A plurality of holes 13 are arranged in the floor of a boat cabin, typically adjacent a cabinet 29. Fishing rods 15 are arranged for storage with handles 17 thereof received within the holes 13. A retractable shelf is provided which can be pulled out from underneath a countertop 31, and includes cutout sections 21 to allow the fishing rods 15 to rest at a section 19 thereof between the handles 17 and a fishing rod tip at its other end. The retractable shelf can be pulled out and/or recessed to be hidden underneath the countertop 31 and the rods 15 can be held snuggly within the cutout sections 21 through means of a retaining cord 43 such as a bungee cord. Alternatively, individual ties and/or holding clips can be provided at each cutout section 21 to hold the rod 15 within the cutout section. The cabinet 29 can be, for example, part of a galley 27 within the cabin as is illustrated in FIG. 1 with, for example, a microwave oven and a refrigerator housed therein.

Figure 2:
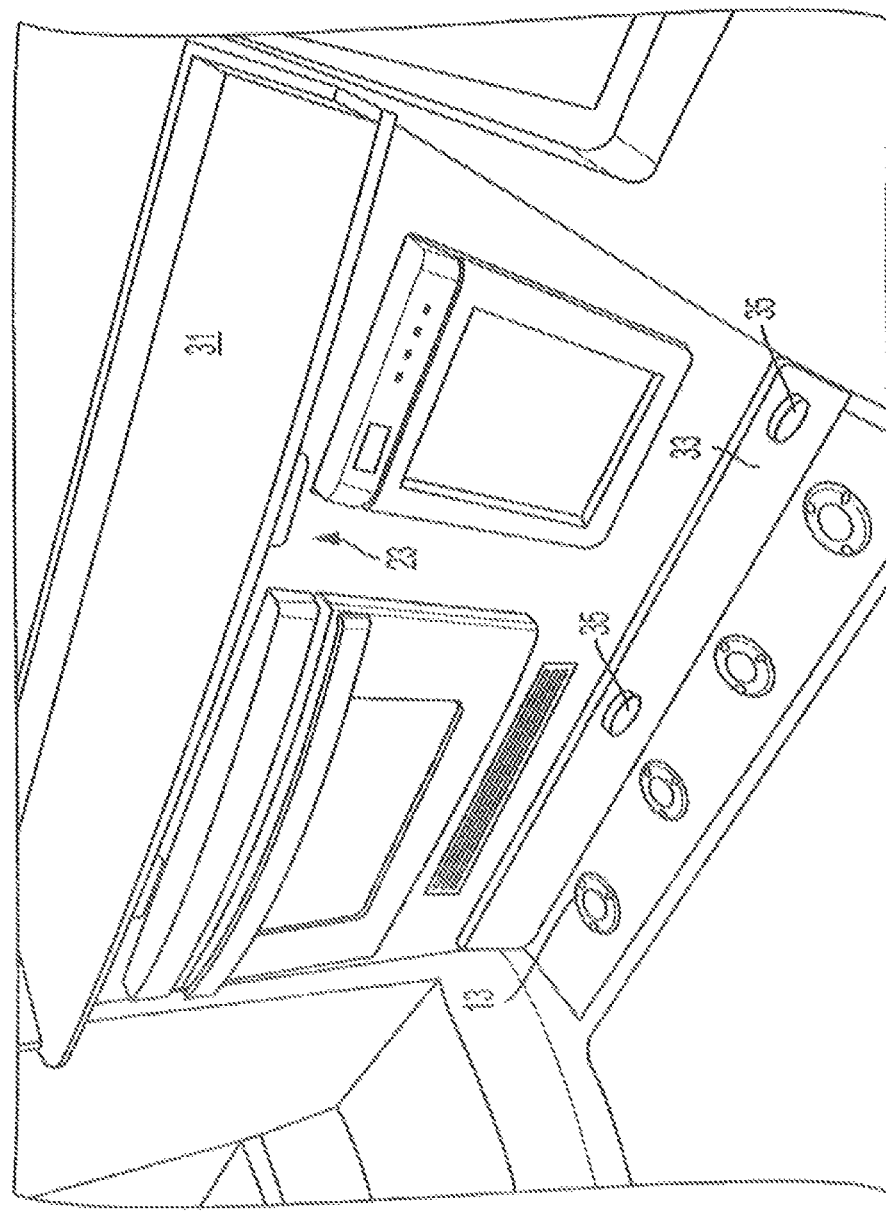
FIG. 2 is a perspective view from the top showing a cabinet within a cabin of a boat and showing the holes in the floor of the cabin with the cover for the holes shown in an open condition.
Figure 5:
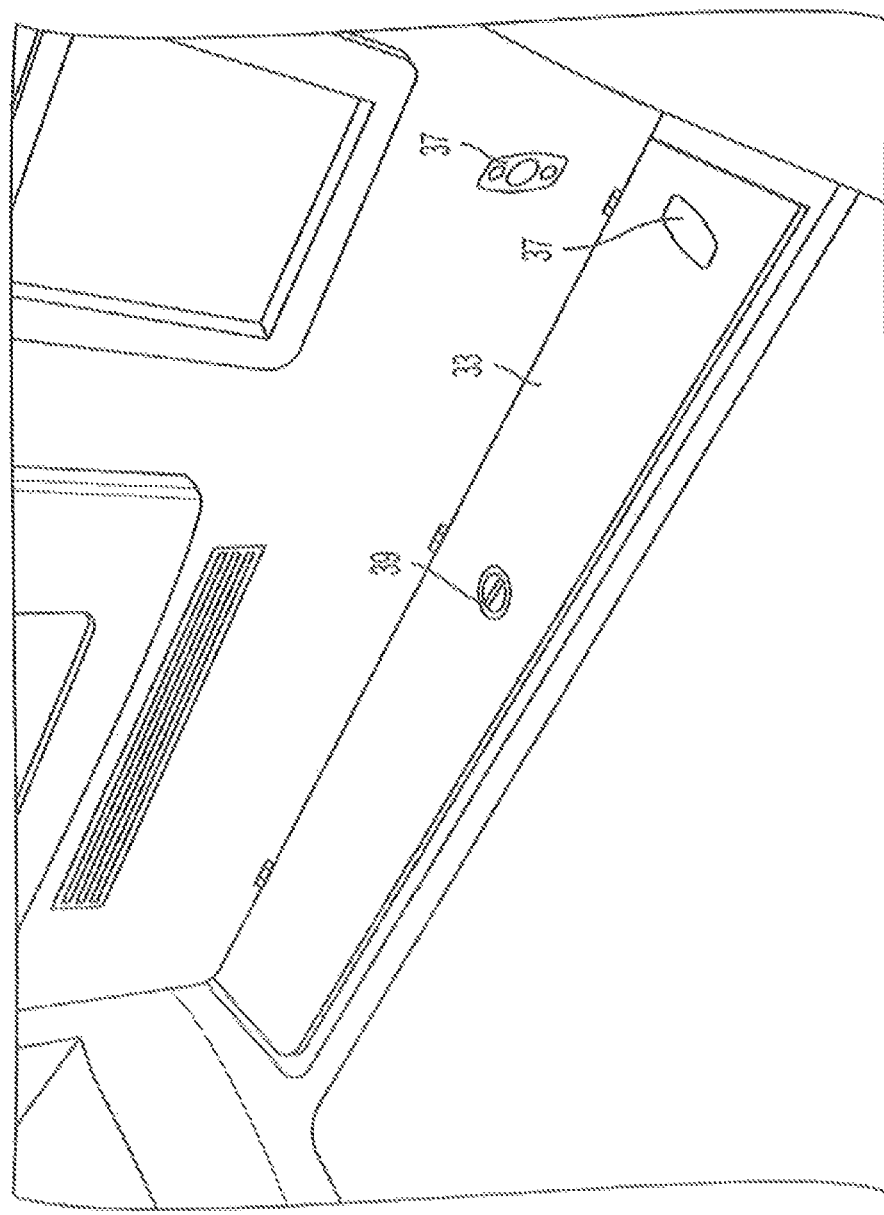
FIG. 5 is a view like that of FIG. 4 showing the holes in the floor covered by the cover.

FIG. 2 illustrates in perspective view, the system 11 of the invention without the fishing rods 15 received therein. The countertop 31 is more clearly shown with the retractable shelf 23 recessed under the countertop 31. When not in use, a cover 33 can be lowered as shown in FIG. 5 to cover the holes 13. As also shown in FIG. 5, engaging members 37 on the top of the cover 33 and against the counter can serve to hold the cover 33 up when in open position for the holes 13 to receive the fishing rod handles 17 therein. As also shown in FIG. 5, a pull handle 39 can be provided to allow ease of opening the cover 33 and exposing the holes 13.

Referring again to FIGS. 2 and 3, the cover 33 on its side facing the holes 13 includes raised surfaces 35 to allow the cover 33 to rest in a stable manner when in a closed position and not wobble if weight is placed on it.

Figure 3:
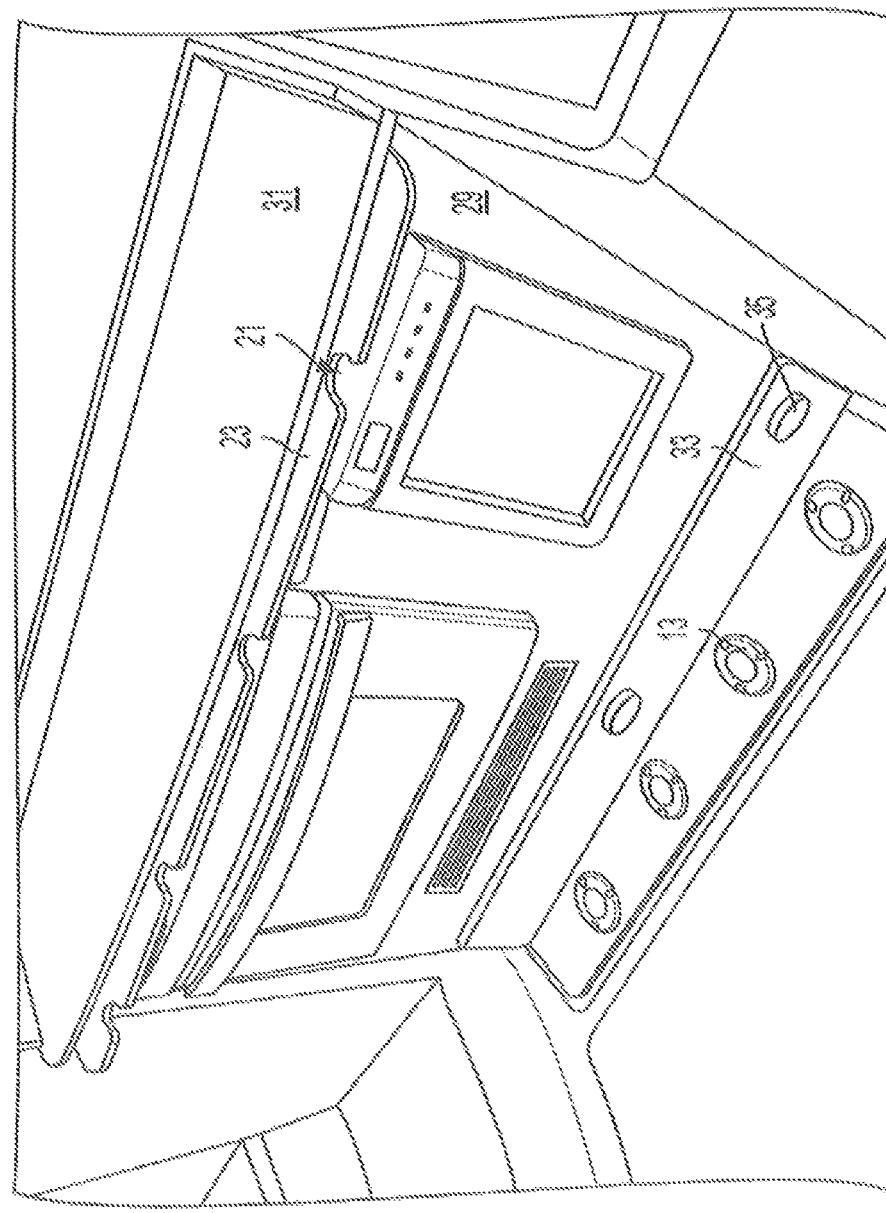
FIG. 3 is view like that of FIG. 2 but showing a retractable shelf in an extended position with cutout sections aligned with the holes in the floor for receiving sections of fishing rods therein.

As shown in FIG. 3, the retractable shelf 23 can be pulled out with the cutout sections 21 shown in alignment with respective holes 13 to allow the fishing rods to be received therein and held securely within the cabin of a boat through use of the retaining cord or line structure.

Figure 4:
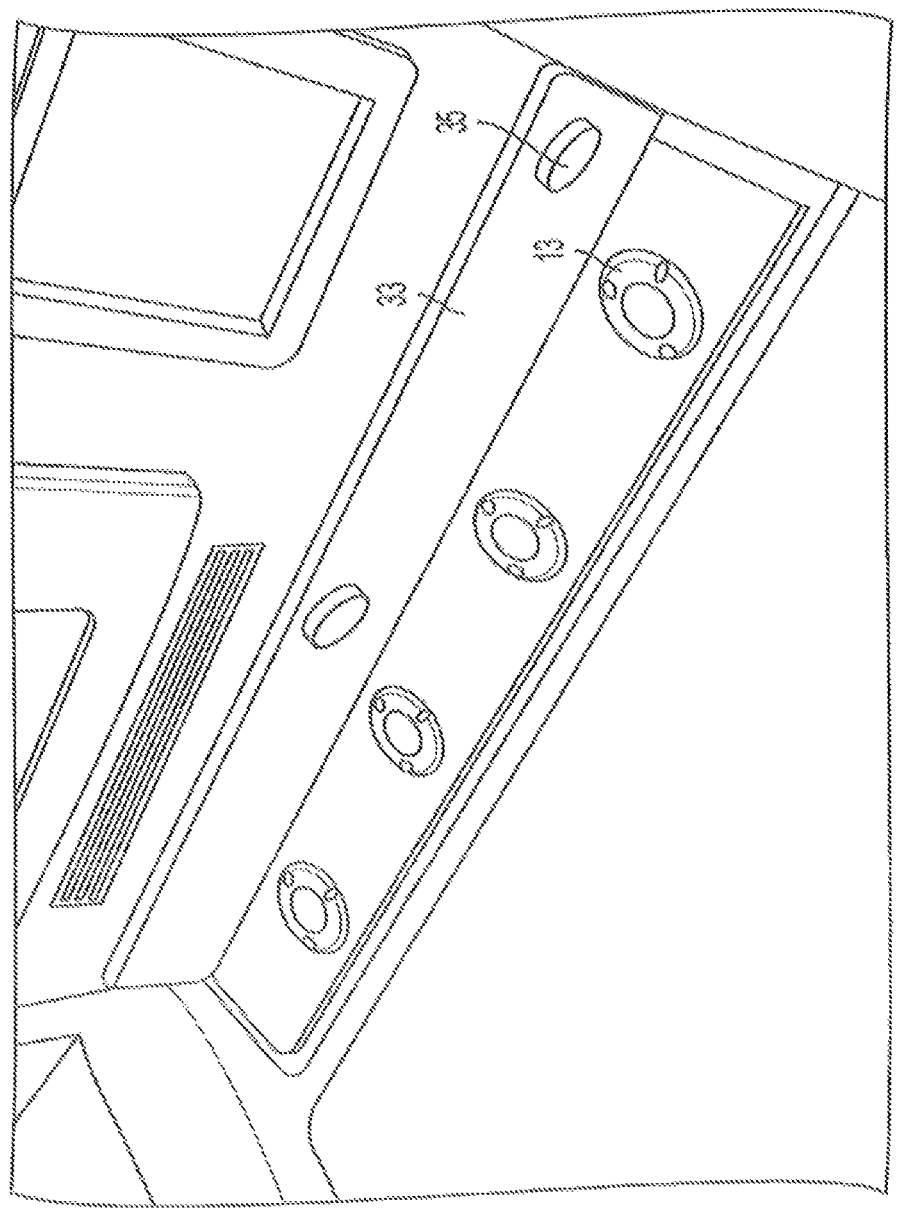
FIG. 4 is a perspective view showing an enlarged view of the holes in the floor and the cover of the rod storage system of the invention.

FIG. 4 illustrates a slightly enlarged view as compared to that of FIG. 3 of the holes 13 in the floor, the lid 33, and the raised surfaces 35.

Finally, FIG. 6 is a view from the bottom, illustrating the retractable shelf 23, cutout sections 21, and handle 41.

Having generally described the invention, the same will become better understood from the appended claims in which it is set forth in a non-limiting manner.

The invention claimed is:

1. A fishing rod storage system, comprising:
   a) at least one hole in a floor of a cabin of a boat, said at least one hole configured to receive a handle of at least one fishing rod;
   b) a retractable shelf mounted on a cabinet adjacent and above said at least one hole, said retractable shelf having at least one cutout section configured to receive a section of the at least one fishing rod; and
   c) a securing mechanism for retaining the at least one fishing rod within the at least one cutout section, said securing mechanism comprising at least one of a securing line, a bungee cord, an individual tie, and a clip arranged with the at least one cutout section.

2. The fishing rod storage system of claim 1, wherein the at least one hole comprises a plurality of holes, each having a bottom to support a respective handle of a corresponding fishing rod from said at least one fishing rod therein, and the at least one cutout section comprises a plurality of cutout sections corresponding in number to the plurality of holes, each for receiving a respective section of each corresponding fishing rod respectively.

3. The fishing rod storage system of claim 2, further comprising a cover for covering the plurality of holes when not in use.

4. The fishing rod storage system of claim 2, wherein the retractable shelf has a shelf handle positioned to allow the shelf handle to be grasped for pulling the retractable shelf into a position.

5. The fishing rod storage system of claim 2, further comprising a countertop mounted on the cabinet in a manner raised from a top of the cabinet to provide a recess within which the retractable shelf is received.

6. The fishing rod storage system of claim 1, wherein said securing line is elastic.

7. The fishing rod storage system of claim 2, wherein said plurality of holes and said plurality of cutout sections in the retractable shelf comprise at least four (4) holes and at least four (4) cutouts.

8. In a fishing boat cabin, a fishing rod storage system comprising:
   a) at least one hole in a floor of the fishing boat cabin, said at least one hole configured to receive a handle of at least one fishing rod;
   b) a retractable shelf mounted on a cabinet adjacent and above said at least one hole, said retractable shelf having at least one cutout section configured to receive a section of at least one fishing rod; and
   c) a securing mechanism for retaining the at least one fishing rod within the at least one cutout section, said securing mechanism comprising at least one of a securing line, a bungee cord, individual tie and clip arranged with the at least one cutout section.

9. The fishing rod storage system of claim 8, wherein the at least one hole comprises a plurality of holes, each having a bottom to support a respective handle of a corresponding fishing rod from the at least one fishing rod therein, and the at least one cutout section comprises a plurality of cutout sections corresponding in number to the plurality of holes, each for receiving a respective section of each corresponding fishing rod respectively.

10. The fishing rod storage system of claim 9, further comprising a cover for covering the plurality of holes when not in use.

11. The fishing rod storage system of claim 9, wherein the retractable shelf has a shelf handle positioned to allow the shelf handle to be grasped for pulling the retractable shelf into a position.

12. The fishing rod storage system of claim 9, further comprising a countertop mounted on the cabinet in a manner raised from a top of the cabinet to provide a recess within which the retractable shelf is received.

13. The fishing rod storage system of claim 9, wherein said securing line is elastic.

14. The fishing rod storage system of claim 9, wherein said plurality of holes and said cutouts in the retractable shelf comprise at least four (4) holes and at least four (4) cutouts.

* * * * *